(12) United States Patent
Shao

(10) Patent No.: US 9,884,778 B2
(45) Date of Patent: Feb. 6, 2018

(54) FILTER WITH MAGNET AND PROTECTIVE BUSHING

(71) Applicant: Meiju Shao, Ningbo (CN)

(72) Inventor: Meiju Shao, Ningbo (CN)

( * ) Notice: Subject to any disclaimer, the term of this patent is extended or adjusted under 35 U.S.C. 154(b) by 0 days.

(21) Appl. No.: 15/048,446

(22) Filed: Feb. 19, 2016

(65) Prior Publication Data

US 2017/0240440 A1   Aug. 24, 2017

(51) Int. Cl.
| | | |
|---|---|---|
| *C02F 1/48* | (2006.01) | |
| *B01D 35/06* | (2006.01) | |
| *B03C 1/28* | (2006.01) | |
| *B03C 1/30* | (2006.01) | |
| *C02F 101/10* | (2006.01) | |

(52) U.S. Cl.
CPC .............. *C02F 1/488* (2013.01); *B01D 35/06* (2013.01); *B03C 1/286* (2013.01); *B03C 1/30* (2013.01); *C02F 1/481* (2013.01); *B01D 2201/347* (2013.01); *C02F 2101/10* (2013.01)

(58) Field of Classification Search
CPC .............. B01D 35/06; B01D 2201/301; B01D 2201/302; B01D 2201/304; B01D 2201/24; B01D 2201/347; B01D 2201/0415; B01D 29/906; B03C 1/28; B03C 1/286; B03C 1/30; C02F 1/48; C02F 1/481; C02F 1/488; C02F 2101/10
See application file for complete search history.

(56) References Cited

U.S. PATENT DOCUMENTS

| 3,224,585 | A | * | 12/1965 | Scavuzzo | ............... | B01D 35/14 |
| | | | | | | 210/136 |
| 3,669,274 | A | * | 6/1972 | Happ | ............... | C02F 1/481 |
| | | | | | | 210/222 |
| 4,879,045 | A | * | 11/1989 | Eggerichs | ............... | B03C 1/035 |
| | | | | | | 204/557 |
| 4,883,591 | A | * | 11/1989 | Belasco | ............... | C02F 1/481 |
| | | | | | | 210/222 |

(Continued)

FOREIGN PATENT DOCUMENTS

| FR | 1532437 | A | * | 7/1968 | ............... | B01D 35/14 |
| GB | 272784 | A | * | 6/1927 | ............... | B03C 1/30 |

OTHER PUBLICATIONS

English language machine translation of FR1532437A, generated May 25, 2017, pp. 1-6.*

*Primary Examiner* — David C Mellon
(74) *Attorney, Agent, or Firm* — Hamre, Schumann, Mueller & Larson, P.C.

(57) ABSTRACT

The present disclosure relates to a filter, which comprises a housing, a protective bushing, a magnetic bar and a filter screen. The protective bushing, the magnetic bar and the filter screen are disposed in the housing. The protective bushing comprises a cavity and a channel. The channel is disposed along the axial direction of the cavity. The magnetic bar inside the filter adsorbs metal impurities in water in the channel. The shape of the channel increases the length of the flow path of the water so that the metal impurities in the water can be guaranteed to be sufficiently adsorbed by the magnetic bar. The filter screen filters out non-metal impurities in the water. An exhaust valve provided at the top of the protective bushing balances air pressure inside the filter and outside the filter, such that the water can flow out and in smoothly.

9 Claims, 4 Drawing Sheets

(56) References Cited

U.S. PATENT DOCUMENTS

| | | | | |
|---|---|---|---|---|
| 5,770,054 A | * | 6/1998 | Ardes | B01D 29/21 210/130 |
| 6,294,089 B1 | * | 9/2001 | Yeh | B01D 35/06 210/222 |
| 2004/0129629 A1 | * | 7/2004 | Malgorn | B01D 29/15 210/458 |
| 2006/0283783 A1 | * | 12/2006 | Adey | B03C 1/284 209/39 |
| 2014/0367340 A1 | * | 12/2014 | Caleffi | B03C 1/288 210/695 |
| 2015/0151220 A1 | * | 6/2015 | Adey | B03C 1/286 210/512.1 |

* cited by examiner

FILTER WITH MAGNET AND PROTECTIVE BUSHING

FIELD OF THE INVENTION

The present invention relates to the technical field of water cleaning and filtering, in particular relates to a filter.

BACKGROUND OF THE INVENTION

Nowadays, many areas employ floor-heating systems to increase room temperature. In the floor heating system, floor-heating pipes are laid under the floor so as to radiate heat in the room. At present, in prior art, the heating water is flowing in the floor heating pipe, that is, the heating water enters through the inlet and then flows out from the outlet of the floor heating pipe. When the floor heating pipe is fabricated, the temperature of the inside water is about 80° C. There are varieties of metal impurities and non-metal impurities mixed in the water. The metal impurities can seriously abrade the floor heating apparatus. The usage life of the floor heating apparatus can be extended by the usage of filter. Most existing filters can only remove metal impurities, but cannot remove non-metal impurities effectively. The impurities left inside the filter have accumulated more and more over time that can easily block the filter and influence the heating effect of the floor heating system. The disassembling of the filter and the replacement of the filter cartridge should be performed by professional service personnel, which is not only inconvenient, but also increases the maintenance cost.

SUMMARY OF THE INVENTION

The present invention provides a filter in order to solve the problems that the filter has only single function, cannot filter out both the metal impurities and the non-metal impurities at the same time, and it will need professional service personnel to disassemble the filter to replace the filter cartridge, which is not only inconvenient, but also increases maintenance cost.

In order to solve the above technical problems, the technical solution adopted by the present invention is in that:

A filter, which comprises a protective bushing, a magnetic bar and a filter screen, wherein the protective bushing, the magnetic bar and the filter screen are disposed in the housing; the protective bushing comprises a cavity and a channel; the channel is disposed along the axial direction of the cavity; the channel is in S shape; the magnetic bar is disposed in the cavity of the protective bushing; and the filter screen is provided with a plurality of holes.

Preferably, the protective bushing comprises an exhaust pipe which extends along the axial direction of the cavity to the top of the protective bushing; the side wall of the exhaust pipe is provided with a plurality of openings; the top of the exhaust pipe is provided with an exhaust valve; and the outside wall of the channel is provided with a plurality of reinforcing ribs.

Preferably, the filter screen is disposed under the protective bushing.

Preferably, the housing is made up by an upper cover, a body and a lower cover, wherein the upper cover and the lower cover are fitted at two ends of the body; the body comprises a water inlet, a water outlet, a first end and a second end, and the water inlet is positioned above the water outlet.

Preferably, the inside wall of the upper cover is provided with first threads, the outside of the upper cover is provided with a plurality of first recesses; the inside wall of the lower cover is provided with second threads, and the outside of the lower cover is provided with a plurality of second recesses.

Preferably, the first end of the body is provided with threads that are cooperated with the first threads and the second end is provided with threads that are cooperated with the second thread.

Preferably, the filter further comprises a first seal ring and a second seal ring; wherein the first seal ring is located at the junction between the top of the protective bushing and the first end; the second seal ring is located at the junction between the second end and the lower cover.

Preferably, the top of the magnetic bar is provided with a magnetic bar nut.

Preferably, the filter further comprises an operating handle; the operating handle comprises an operating portion and a circular fitting part, the circular fitting part on the operating handle is provided with a plurality of protrusions that are cooperated with the first recesses and the second recesses.

Preferably, the protective bushing is made of plastic material.

By adopting the above-mentioned technical solution, the following advantages can be obtained. The magnetic bar inside the filter of the present invention can adsorb metal impurities in the water in the channel. The channel is in S shape that can increase the length of the flow path of the water so that the metal impurities in water can be guaranteed to be sufficiently adsorbed by the magnetic bar. The filter screen can filter out the non-metal impurities in water. The exhaust valve can keep the balance between air pressure inside the filter and the air pressure outside the filter, which can ensure that the water can flow out and in smoothly. The filter is attached with an operating handle. If the user wants to disassemble the filter to clear up the metal impurities and non-metal impurities in the filter, he can disassemble the filter by means of the operating handle without the need of professional personnel, which is convenient and simple.

BRIEF DESCRIPTION OF THE DRAWINGS

In order to more clearly describe the embodiments of the present invention or technical solutions of the prior art, the drawings which will be used in the description of the embodiments or the prior art will be briefly described. Obviously, those drawings are only some embodiments of the present invention. As to those ordinarily skilled in the art, they can obtain other drawings based on these drawings without creative efforts.

DETAILED DESCRIPTION OF THE INVENTION

The technical solution of the embodiment of the present invention will be described clearly and thoroughly in conjunction with the drawings of the embodiment of the present invention in order to make the object, the technical solutions and advantages of the embodiment of the present invention more clear. Obviously, the embodiments described here are only some embodiments of the present invention, not all the embodiments of the present invention. Based on the described embodiments of the present invention, those ordinarily skilled in the art can obtain other embodiments without creative efforts, and all those embodiments are embraced within the protection scope of the present invention.

Figure 1:
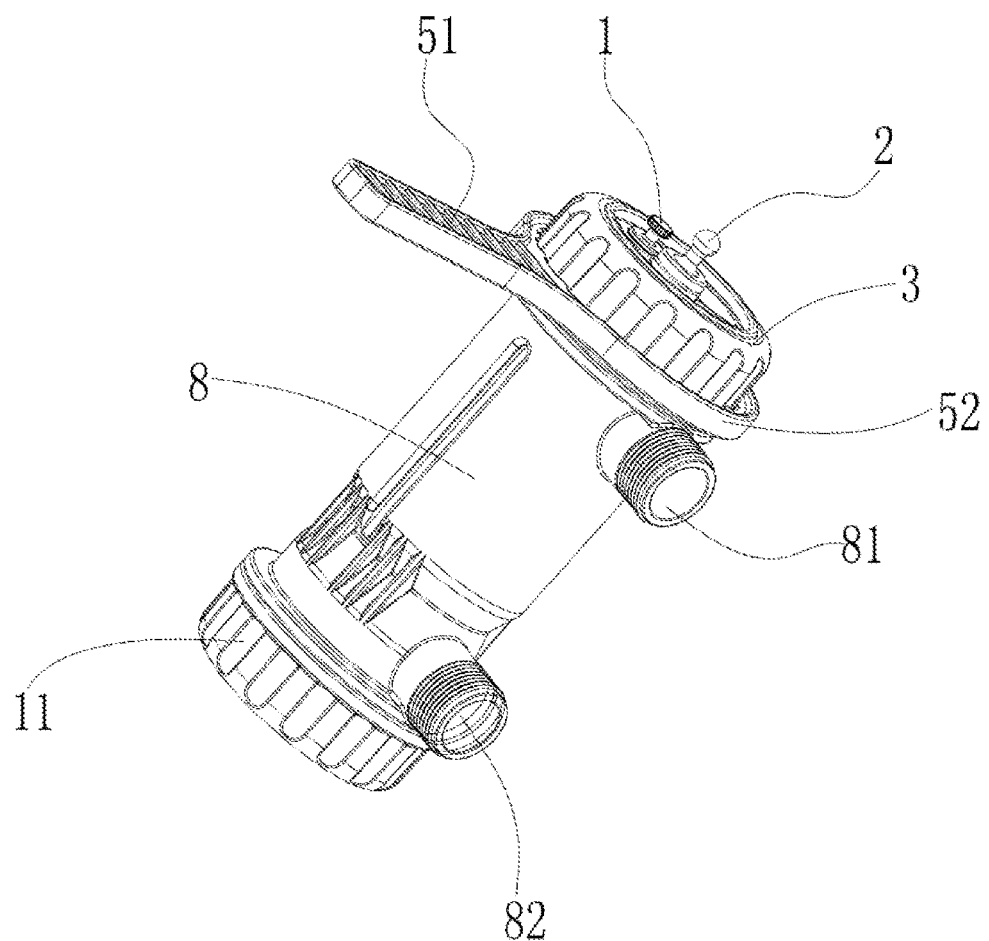
FIG. 1 is a structural view of a filter according to the present invention.
Figure 2:
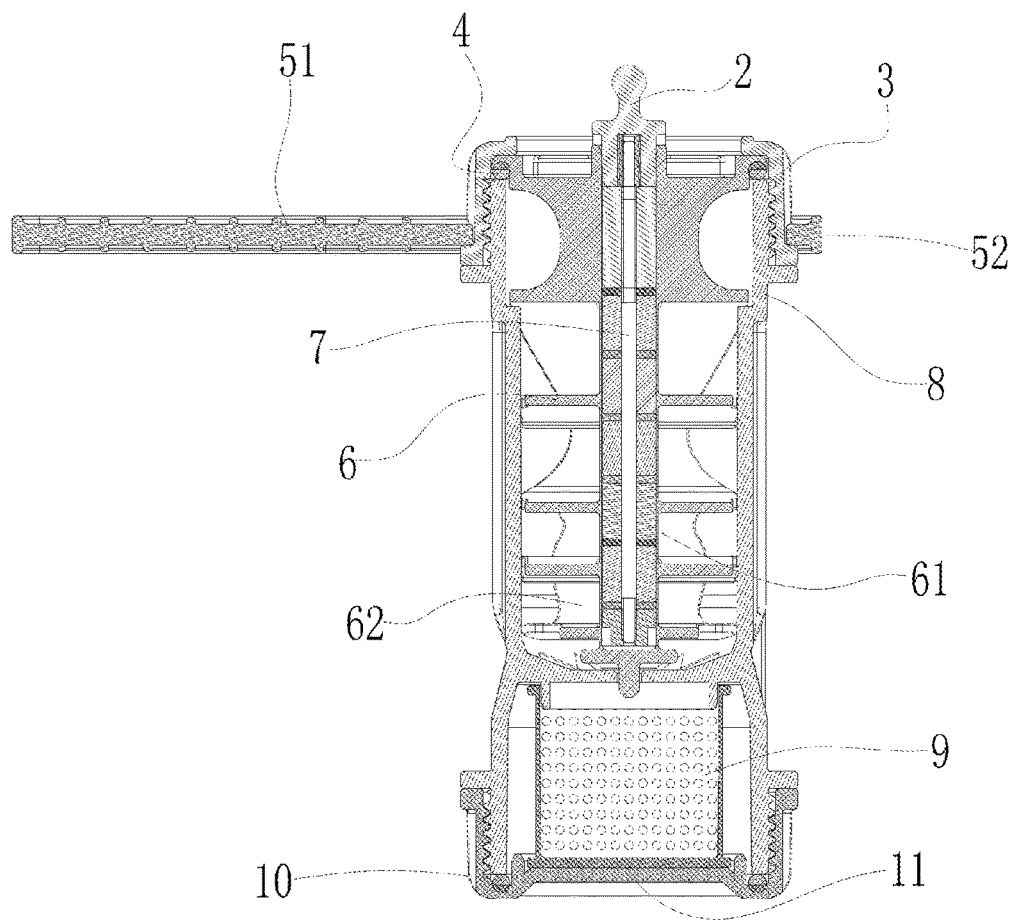
FIG. 2 is a sectional view showing the filter according to the present invention.
Figure 3:
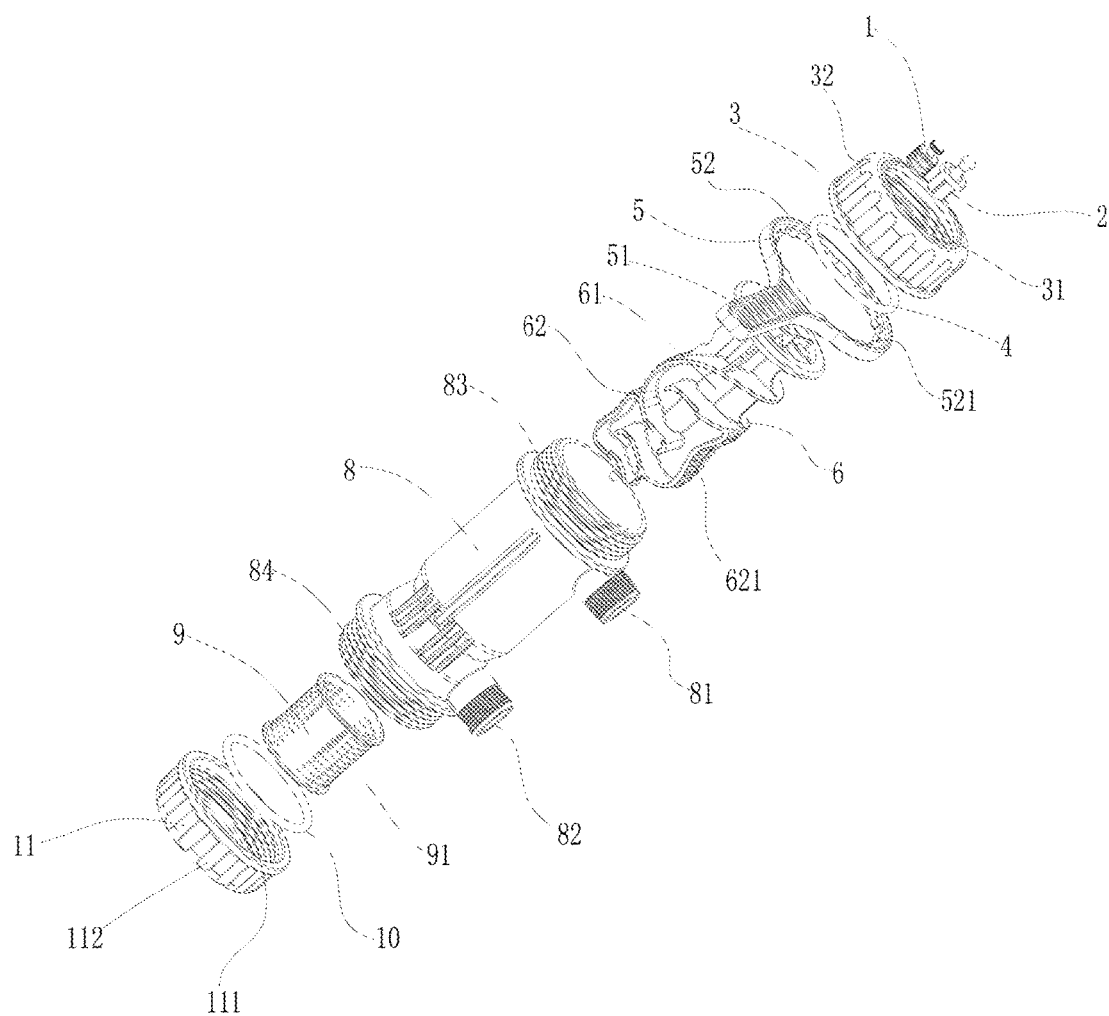
FIG. 3 is an exploded view showing the filter according to the present invention.
Figure 4:
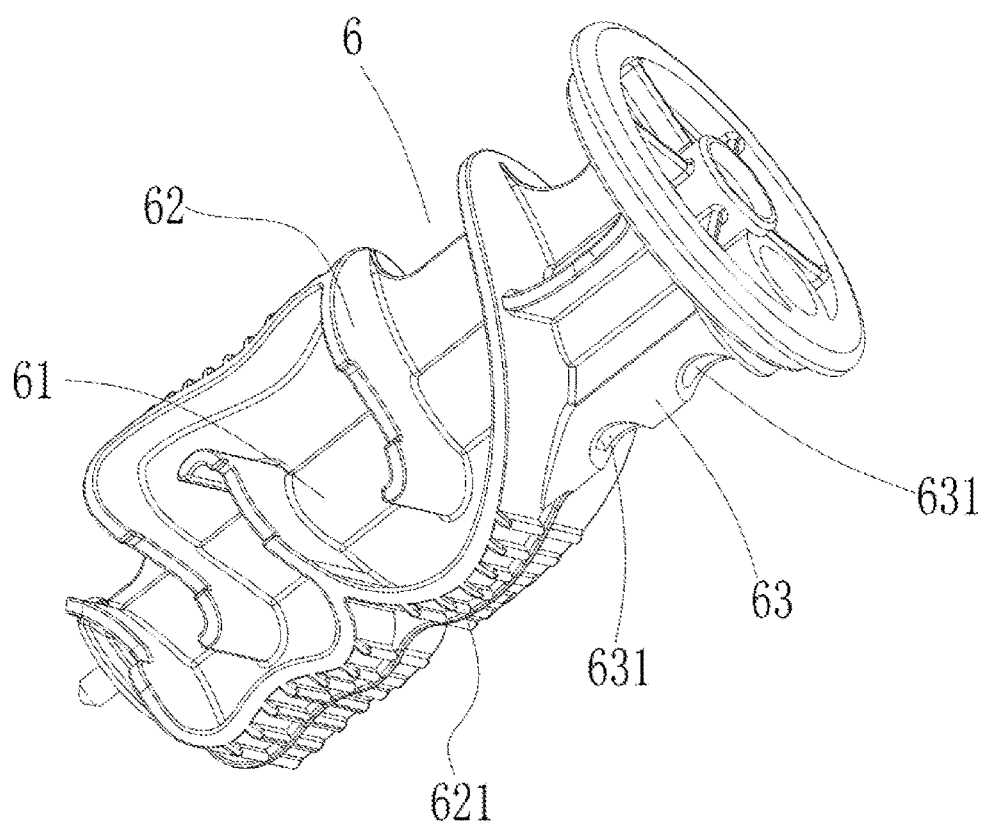
FIG. 4 is a structural view showing a protective bushing of the filter according to the present invention.

As shown in FIG. 1 to FIG. 4, the filter comprises a housing, an exhaust valve 1, a magnetic bar nut 2, a first seal ring 4, an operating handle 5, a protective bushing 6, a magnetic bar 7, a filter screen 9 and a second seal ring 10. The housing is made up of an upper cover 3, a body 8 and a lower cover 11. The upper cover 3 and the lower cover 11 are fitted at two ends of the body 8; the protective bushing 6, the magnetic bar 7 and the filter screen 9 are contained in the housing. The magnetic bar nut 2 is disposed at the top of the magnetic bar 7. The filter screen 9 is disposed under the protective bushing 6, and the protective bushing 6 is made of plastic material.

The inside wall of the upper cover 3 is provided with first threads 31, and the outside of the upper cover 3 is provided with a plurality of first recesses 32. The inside wall of the lower cover 11 is provided with second threads 111, and the outside of the lower cover 11 is provided with a plurality of second recesses 112.

The operating handle 5 comprises an operating portion 51 and a circular fitting part 52, the circular fitting part 52 of the operating handle 5 is provided with a plurality of protrusions 521 that are cooperated with the first recesses 32 and the second recesses 112.

The protective bushing 6 comprises a cavity 61, a channel 62 and an exhaust pipe 63, the side wall of the exhaust pipe 63 is provided with a plurality of openings 631. The exhaust pipe 63 extends along the cavity 61 to the top of the protective bushing 6. The exhaust valve 1 is disposed at the top of the exhaust pipe 63. The outside wall of the channel 62 is provided with a plurality of reinforcing ribs 621. The channel 62 can be disposed along the axial direction of the cavity 61 and the channel 62 is S-shaped.

A magnetic bar 7 is located in the cavity 61 of the protective bushing 6. The body 8 comprises a water inlet 81, a water outlet 82, a first end 83 and a second end 84. The water inlet 81 is located above the water outlet 82.

The first end 83 of the body 8 is provided with threads that are cooperated with the first threads 31 of the upper cover 3. The second end 84 is provided with threads that are cooperated with the second threads 111 of the lower cover 11. A first seal ring 4 is located at the junction between the top of the protective bushing 6 and the first end 83. A second seal ring 10 is located at the junction between the second end 84 and the lower cover 11. Therefore, the first seal ring 4 and the second seal ring 10 can perform good seal function.

The filter screen 9 is provided with a plurality of holes 91. Water can flow into the filter through the water inlet 81 and flows downwards along the channel 62. Because the channel 62 is S-shaped and a magnetic bar 7 is provided in the cavity 61, the metal impurities mixed in the water can be adsorbed to the outside wall of the cavity 61 under magnetic force. The S shape of the channel 62 extends the length of the water flow path, so that the metal impurities can be guaranteed to be sufficiently adsorbed by the magnetic bar 7. Finally, the water in the filter can flow through the filter screen 9. The filter screen 9 is provided with a plurality of holes 91 with small diameter, so that the non-metal impurities in the water can be filtered out by the filter screen 9. The completely filtered water can flow out through the water outlet 82.

After a period of usage of the filter, the impurities in the filter will gradually increase, therefore the filter needs to be disassembled to completely remove the metal impurities on the protective bushing 6 and the non-metal impurities in the filter screen 9. To disassemble the filter, the circular fitting part 52 of the operating handle 5 is placed over the upper cover 3 or the lower cover 11. Because the circular fitting part 5 is provided with protrusions 521 that are cooperated with the first recesses 32 of the upper cover 3 or the second recesses 112 of the lower cover 11, the user can exert force on the operating handle 5 so as to turn the upper cover 3 or the lower cover 11, thereby disassembling the upper cover 3 or the lower cover 11 from the body 8. Because the top of the magnetic bar 7 is provided with a magnetic bar nut 2, the magnetic bar 7 can be conveniently taken out after disassembling. After removing the magnetic bar 7, the metal impurities on the protective bushing 6 will not be influenced by any magnetic force. Both the metal impurities on the protective bushing 6 and the non-metal impurities in the filter screen 9 can be conveniently cleaned up during the cleaning process.

The top of the protective bushing 6 is provided with an exhaust valve 1 which cooperated with the exhaust pipe 63. The air in the filter can flow into the exhaust pipe 63 through the openings 631 and discharge from the exhaust valve 1, so that the air pressure inside the filter and the air pressure outside filter can be balanced and therefore the stability of the flow rate when flowing downwards can be ensured.

The magnetic bar 7 inside the filter of the present invention can adsorb metal impurities in the water flowing through the channel 62. The channel 62 is in S shape which can extend the length of the water flow path; therefore the metal impurities in water can be guaranteed to be sufficiently adsorbed by the magnetic bar 7. The filter screen 9 can filter out the non-metal impurities in the water. The exhaust valve 1 at the top of the protective bushing 6 can keep the balance between the air pressure inside the filter and the air pressure outside the filter so that the water can flow in and out smoothly. The filter is attached with an operating handle 5. If the filter needs to be disassembled to clear up the metal impurities and non-metal impurities inside the filter, the user can disassemble the filter by means of the operating handle 5 without the need of professional operator. Such operation is simple and convenient.

Finally, it should be noted that the above embodiments are only used for illustrating the technical solutions of the present invention rather than limiting them. Although the present invention has been illustrated in detail with the reference to the technical solutions set forth in the above embodiments, as to those ordinarily skilled in the art, the technical solutions in various embodiments can be modified or partial technical features of them can be substituted by equivalent features. All those modifications or substitutions do not make the nature of respective technical solutions departing from the spirit and scope of the various embodiment of the present invention.

What is claimed is:
1. A filter, characterized in that: the filter comprises a protective bushing, a magnetic bar and a filter screen, wherein the protective bushing, the magnetic bar and the filter screen are disposed in a housing; the protective bushing comprises a cavity and a channel; the channel is disposed along an axial direction of the cavity; the channel is in a convoluted shape; the magnetic bar is disposed in the cavity of the protective bushing; and the filter screen is provided with a plurality of holes, wherein the protective bushing comprises an exhaust pipe which extends along the axial direction of the cavity to a top of the protective bushing;

a side wall of the exhaust pipe is provided with a plurality of openings;

the top of the exhaust pipe is provided with an exhaust valve; and an outside wall of the channel is provided with a plurality of reinforcing ribs.

2. The filter according to claim 1, characterized in that the filter screen is disposed under the protective bushing.

3. The filter according to claim 1, characterized in that the housing is made up by an upper cover, a body and a lower cover, wherein the upper cover and the lower cover are fitted at a first end and a second end of the body; the body comprises a water inlet, a water outlet, the first end and the second end, wherein the water inlet is positioned above the water outlet.

4. The filter according to claim 3, characterized in that an inside wall of the upper cover is provided with first threads, an outside of the upper cover is provided with a plurality of first recesses; an inside wall of the lower cover is provided with second threads, and an outside of the lower cover is provided with a plurality of second recesses.

5. The filter according to claim 4, characterized in that the first end of the body is provided with threads that engage with the first threads and the second end is provided with threads that engage with the second threads.

6. The filter according to claim 5, characterized in that the filter further comprises a first seal ring and a second seal ring; wherein the first seal ring is located at a junction between a top of the protective bushing and the first end; the second seal ring is located at a junction between the second end and the lower cover.

7. The filter according to claim 1, characterized in that a top of the magnetic bar is provided with a magnetic bar nut.

8. The filter according to claim 5, characterized in that the filter further comprises an operating handle; the operating handle comprises an operating portion and a circular fitting part, the circular fitting part on the operating handle is provided with a plurality of protrusions that engage with the first recesses and the second recesses.

9. The filter according to claim 1, characterized in that the protective bushing is made of plastic material.

\* \* \* \* \*